UNITED STATES PATENT OFFICE.

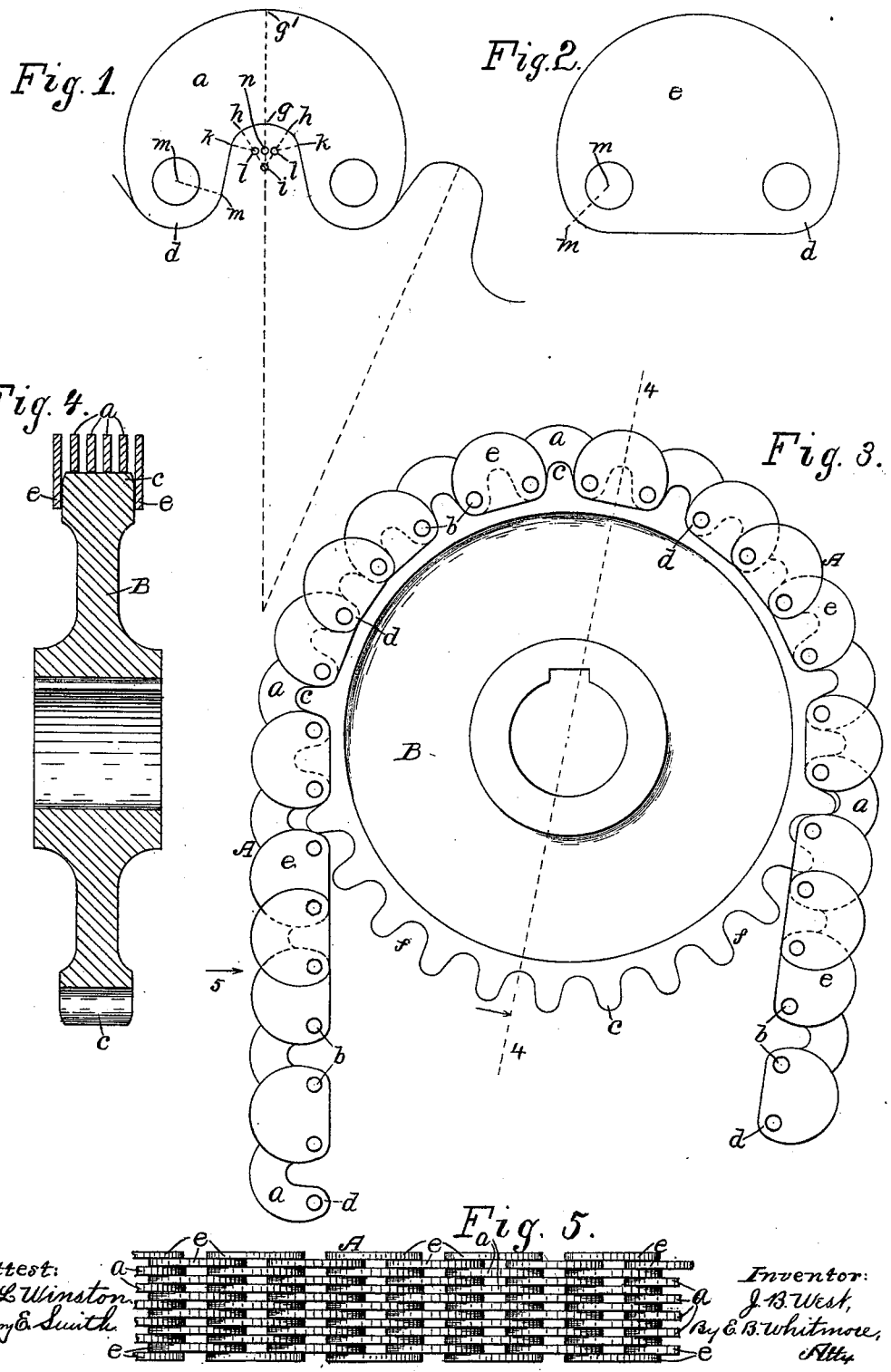

JONATHAN B. WEST, OF ROCHESTER, NEW YORK.

SPROCKET-CHAIN.

SPECIFICATION forming part of Letters Patent No. 653,462, dated July 10, 1900.

Application filed August 12, 1897. Serial No. 648,045. (No model.)

*To all whom it may concern:*

Be it known that I, JONATHAN B. WEST, of Rochester, in the county of Monroe and State of New York, have invented a new and useful Improvement in Sprocket-Chains, which improvement is fully set forth in the following specification and shown in the accompanying drawings.

My invention relates generally to sprocket-chains, but more particularly to chains having flat links placed side by side and formed to arch over the points of the teeth of the gear.

One object of my invention is to provide links to fall at the ends of the teeth of the gear to strengthen the chain and to prevent it from running off of the gear at either side.

A second object of the invention is to so form the links as to give them additional strength where subjected to the greatest flexural stress.

A further object of the invention is to provide such a chain that the gears with which it is used may be made much lighter at the rim or periphery, the retaining-flanges commonly employed being avoided, and making the gear and the chain of more nearly equal strength.

The invention is hereinafter fully described, and more particularly pointed out in the claim.

Referring to the drawings, Figure 1 shows in simple lines the plan of a link. Fig. 2 similarly shows the plan of a blank link. Fig. 3 is a side elevation of a gear with chain in place thereon. Fig. 4 is a diametrical section on the dotted line 4 4 in Fig. 3. Fig. 5 is an edge view of the chain seen as indicated by arrow 5 in Fig. 3. Figs. 1 and 2 are drawn to an exaggerated scale to better show the exact form of the links.

Referring to the drawings, A is a chain consisting of flat curved links $a$, placed in lines alternated and overlapping at their ends, and blank side links $e$, all held together by transverse pintles or rivets $b$. The intermediate links $a$ are formed to arch over the points of the teeth $c$ of the gear B, the rounded joined ends $d$ of said links occupying the interdental spaces $f$ of the gear. Links similar to those referred to by $a$ have been before known and used; but as heretofore constructed there has been a liability to break through the middle of the link along a line corresponding with the dotted line $g\ g'$, Fig. 1, the metal first giving way at the concave edge at $g$. It is this part of the link that is subjected to the greatest strain of tension and flexure combined, from the fact that the body of the link or part crossed by said dotted line $g\ g'$ lies at one side of the line of pull upon the links when in use, said line of pull being through the line of pintles $b$. I aim to overcome this difficulty by forming the links so that the greatest breadth of metal occurs where the greatest stress falls and by flattening the curve at the inner edge of the link where the metal tends first to part or give way. This last form aids to prevent the starting of a rupture of the metal, which, combined with the amount of metal lying along the line of possible rupture $g\ g'$, renders the link strong and firm.

Fig. 1 shows in detail the construction of the link. The inner concaved edge as a whole is not circular—that is to say, the arc $h\ h$ is formed with a radius $h\ i$, while the two adjacent arcs $h\ k\ h\ k$ are formed with smaller radii $k\ l\ k\ l$. This brings the sharpness of the curve at one side of the point $g$ or away from the middle point between the rivets, where the metal is first liable to give away from a pull upon the chain. The links each vary in width, the greatest width being at a point midway between the pintles—that is to say, at $g\ g'$, Fig. 1. The outer and the inner curved edges of the middle part of the body of a link are eccentric, the part of the inner edge from $h$ to $h$ being formed from the center $i$, as already stated, and the outer edge either way from the point $g'$ being formed from the center $n$.

The radius $m\ m$ of the rounded ends $d$ of the links is greater than the radius $h\ i$ and considerably greater than the average radius of the internal curve of the link from $k$ around to $k$. This gives great strength to the parts of the links about the rivets, which parts of the links are subjected to the most wear—that is to say, the link is so formed that it has the greatest strength where subjected to the greatest stress of tension and flexure and also great strength where subjected to the greatest wear, and this strengthening of the link is made purposely at the expense of the strength of the teeth of the wheel B. As wheels and chains have usually heretofore been constructed there has been an undesirable disparity between the strength of the gear and that of the chain, the latter being very much weaker of the two and frequently giving away, while the wheel successfully withstands the stress that broke the chain. It is these facts that I had in mind and by which I was guided when forming the links as above described. Also for the purpose of rendering the strength of the chain and that of the gear more nearly equal I place at the outside of the open links $a$ the blank links $e$, to reach down at the ends of the teeth of the gear and so do away with the flanges usually formed at the sides to keep the chain from running off. These blank links add much to the strength of the chain and by means of them the flanges are avoided, thus further reducing the usual preponderance of strength of the wheel over that of the chain, giving to the latter the advantage of the difference. Thus constructed the chain will have nearly as much strength as the wheel, but ordinarily will give way before the wheel when subjected to an excessive stress or pull. This is desirable, as it is easier usually to repair the chain than to replace the wheel.

In using the blank links $e$ the ends of the teeth are chamfered, as shown in Fig. 4, so as to allow said links in contact with the teeth to pass readily down at the ends of the latter without catching thereon or chafing.

The circular openings at the rounded ends of the links are concentric with said rounded ends in both forms of the links.

It should be noted that the U-shaped links are all of the same size and that the plain links arranged on the outside of the U-shaped links are also of the same width and length as the U-shaped links, the result being that the chain is very compact and strong and very light in comparison with its strength. The plain links on the outside have a double function. They serve to guide the sprocket-chain around the wheel and render flanges on the wheel unnecessary, and as they contact each pair of the U-shaped links they add materially to the strength of the chain.

What I claim as my invention is—

A sprocket-chain composed of U-shaped links and plain links, the U-shaped links being arranged on the inner sides of the plain links, and pintles for connecting said series of links, both series of links being substantially of the same width and length, substantially as described.

In witness whereof I have hereunto set my hand, this 6th day of August, 1897, in the presence of two subscribing witnesses.

JONATHAN B. WEST.

Witnesses:
ENOS B. WHITMORE,
M. L. WINSTON.